Sept. 30, 1969    A. EIZENBERG    3,469,451
DISPOSABLE THERMOMETER
Filed June 26, 1967
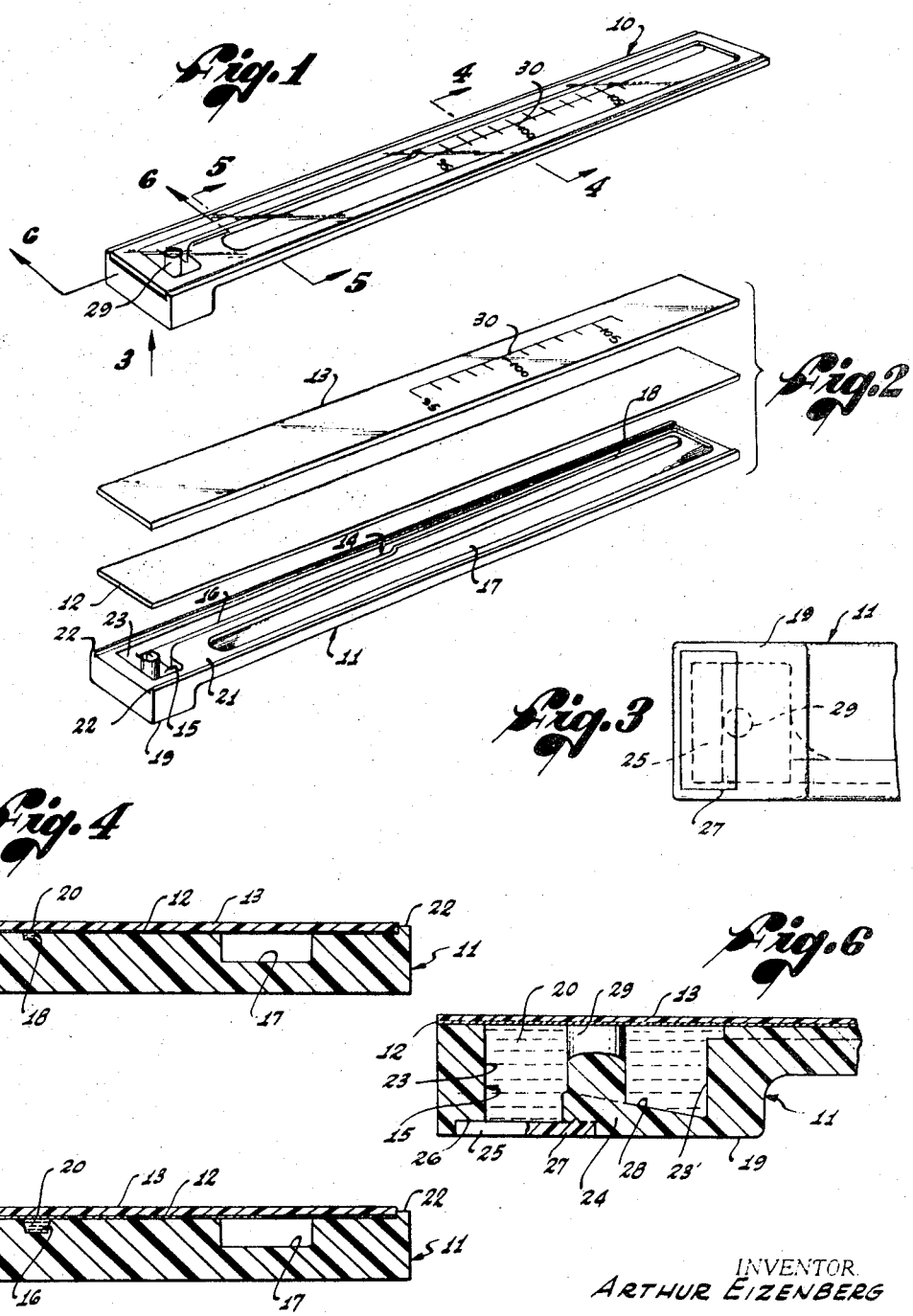
INVENTOR.
ARTHUR EIZENBERG
BY Fulwider, Patton, Rieber
Lee, and Utecht
ATTORNEYS

United States Patent Office

3,469,451
Patented Sept. 30, 1969

3,469,451
DISPOSABLE THERMOMETER
Arthur Eizenberg, Tarzana, Calif., assignor of one-third each to Aaron L. Raznick and David L. Raznick, both of Tarzana, Calif.
Filed June 26, 1967, Ser. No. 648,686
Int. Cl. G01k 1/04
U.S. Cl. 73—371                           15 Claims

ABSTRACT OF THE DISCLOSURE

A disposable thermometer comprising a flat cover member and a base member having molded therein a liquid reservoir, a channel communicating with the liquid reservoir and a gas expansion chamber communicating with the channel. The cover and base member are bonded together to form a thermometer housing which is partially filled with a temperature-expansible organic liquid having a relatively low vapor pressure. The temperature-expansible liquid is carried in the liquid reservoir and expands as the temperature of the measured medium increases.

BACKGROUND OF THE INVENTION

This invention relates to thermometers and more particularly, to thermometers which may be regarded as disposable.

At present, thermometers are relatively expansive because they are difficult to assemble and/or because they are made from relatively expensive materials such as mercury and special thermometer glass. None of these presently-used thermometers can be regarded as disposable thermometers, that is, thermometers which can be used once and discarded because of their low cost.

Because of a demand from, for example, hospitals, for inexpensive, disposable thermometers because of breakage of and sterilization requirements associated with non-disposable thermometers, and the contamination resulting from improperly sterilized, or non-sterile reused, glass thermometers, various attempts have been made to produce such thermometers. Attempts have been made to injection mold, in one step, a complete thermometer but such attempts have proved to be too expensive. Other attempts have been made to assemble plastic thermometers by providing matching top and bottom halves (each half having a portion of the liquid bore formed therein) but precisely mating the half sections proved to be extremely time-consuming and difficult. Still other attempts have failed because the temperature-expansible liquids used in these thermometers have proved to be unsatisfactory, usually because the liquid-vapor pressure was too high, thereby resulting in loss of the liquid from the thermometer or, because the liquid, for example, mercury, has proved too expensive for use in disposable thermometers.

SUMMARY OF THE INVENTION

The herein-described thermometer comprises a base member and a cover member bonded together to provide a thermometer shell. The base member has formed therein a liquid reservoir, a channel communicating with the liquid reservoir and a special gas expansion chamber communicating with the channel. Due to the differences in physical properties between the organic, expansible fluids used herein and, for example, mercury, certain features of the herein-described invention differ substantially from the presently-used, non-disposable thermometers. For example, the reservoir must have a volume less than that volume which will contain all the liquid at the lowest temperature at which the thermometer is to remain operable and a gas expansion chamber must be employed to permit proper flow of the liquid along the channel.

The cover member is a flat sheet containing no channels or grooves thereby eliminating prior art problems arising from attempts to mate the cover and base members. Each of the members comprising the herein-described thermometer is molded individually and is capable of being made on a production basis thereby substantially reducing the costs of production of the herein-described thermometer.

The thermometer of this invention may also be assembled and filled by production line methods thereby further reducing costs.

A particular temperature-expansible liquid is employed which has a relatively low vapor pressure to substantially eliminate liquid loss from the thermometer of this invention. Additionally, the thermal expansion of the liquid is sufficiently large relative to the material forming the base and cover members to enable temperatures to be read accurately.

DESCRIPTION OF THE DRAWINGS

FIGURE 1 is a perspective view of an assembled thermometer of this invention.

FIGURE 2 is an exploded view of the thermometer of FIGURE 1.

FIGURE 3 is a partial bottom plan view taken in the direction of the arrow 3 in FIGURE 1.

FIGURE 4 is a cross-sectional view taken along the line 4—4 of FIGURE 1.

FIGURE 5 is a cross-sectional view taken along the line 5—5 of FIGURE 1.

FIGURE 6 is a cros-sectional view of the liquid reservoir taken along the line 6—6 of FIGURE 1.

DESCRIPTION OF THE PREFERRED EMBODIMENT

The thermometer of this invention has a wide variety of uses. For example, it may be used to measure the temperature of water in fish tanks and of oil in machines and to measure body temperatures of humans. Additionally, although the thermometer of this invention can be made highly durable for long term use, it can also be made inexpensively so that it can be considered disposable. This invention can, therefore, be employed as a disposable, clinical thermometer and, because of the great demand for such a thermometer, will be so described herein.

In general, this invention comprises (a) a base member having a channel molded therein and having a liquid reservoir and an air or gas expansion chamber molded therein which communicate with opposite ends of the channel, (b) a relatively thermally-conductive, yet relatively inflexible top member, (c) an intermediate adhesive layer bonding together the top and bottom members and (d) an organic, temperature-expansible liquid for indicating temperature changes in the medium into which the thermometer is inserted. The temperature-expandsible liquid is carried in the liquid reservoir and expands as a lengthening fluid column up the channel, the length of which is appropriately marked to indicate temperature, as the temperature of the measured medium increases. Conversely, the liquid column decreases in length as the temperature of the measured medium decreases. Air or other gas in the expansion chamber is compressed as the temperature-expansible liquid expands and expands as the liquid decreases in volume to provide substantially uniform movement of the fluid column per unit temperature change over the calibrated temperature range of the particular thermometer.

This invention will be more specifically described in conjunction with FIGURES 1 and 2 in which the numeral 10 designates an assembled thermometer of this invention which comprises a bottom member 11, an adhesive layer 12 and a top member 13. As shown in FIGURE 2, the bottom member has formed therein a channel 14, a liquid reservoir 15 communicating with a generally lower section 16 of the channel and an expansion chamber 17 communicating with a generally upper section 18 of the channel. The base member 11 is preferably of uniform thickness except for an expanded lower end 19 which has formed therein the liquid reservoir 15 which contains an organic, temperature-expandable liquid 20 and which is substantially larger than reservoirs used in conventional mercury type thermometers for the reasons described hereafter. Although the entire base member 11 may have a thickness equal to the thickness of the expanded end 19, it is preferable in clinical thermometers to employ a base member of minimum thickness consistent with the strength requisite for the particular use of the thermometer.

The reservoir 15 may have any desired shape. However, to some extent, the shape of the reservoir 15 will be determined by the size requirements of the reservoir. Because the thermal expansion of the temperature-expansible liquid 20 used herein relative to the thermal expansion of the plastic material forming the thermometer body is substantially less than the relative thermal expansion of conventional thermometer materials, for example, mercury and thermometer glass, the reservoir 15 is necessarily substantially larger than the reservoirs of mercury-glass thermometers to contain the required larger volume of liquid. Therefore, since it is desirable to have clinical thermometers of minimum size, it is preferable to employ a reservoir shape providing maxium volume and minimum dimensions.

Furthermore, it is necessary to design a liquid reservoir 15 so that air or other gas is not admitted into the reservoir because the organic temperature-indicator liquids 20, which are relatively viscous as compared with, for example, mercury, entrap gas entering the reservoir making it virtually impossible to free the entrapped bubbles from the liquid. Such gas entrapment destroys the calibration, and, therefore, the usefulness of the herein-described thermometers. Entrapment of gas in the reservoir 15 is avoided by employing liquid reservoirs which are not large enough to contain all of the indicator liquid 20 at the lowest temperatures at which the thermometer 10 is to remain serviceable. That is, in the serviceable temperature range for a particular thermometer of this invention, some liquid 20 will always be contained in the channel 14. A reservoir having a capacity of about 0.033 cu. in. has proved to be satisfactory in a clinical thermometer containing about 0.4 cc. of mineral oil as the indicator fluid.

Communicating with one end of the liquid reservoir 15 is the channel 14 which extends upwardly from the reservoir along the front face 21 of the base member 11. The channel 14 is of variable cross-section, having a relatively expanded, that is, deeper and wider lower section 16, and a relatively shallow and narrow calibrated section 18. Although the herein-described thermometer is used to determine temperatures in a limited range, for example, from about 95° F. to about 105° F. for clinical thermometers, the thermometers must be able to adapt to a much wider range of temperatures encountered, for example, during shipping and storage. Such temperatures may range from 0° F. to 120° F. As previously noted, the liquid reservoir 15 must be small enough so that some indicator liquid remains in the channel 14 even at the lowest temperatures encountered by the herein-described thermometers. Therefore, the lower section 16 of the channel 14 must accommodate the expansion of the indicator liquid 20 over the temperature range between the lowest temperature expected to be encountered (and remain serviceable) and the lowest temperature for which a particular thermometer is calibrated. For example, for clinical thermometers, the lower section 16 of the channel 14 will generally accommodate indicator liquid expansion in the temperature range between about 0° F. (minimum serviceable temperature and about 95° F.

The dimensions of the expanded section 16 of the channel 14 will vary depending upon the use to which a particular thermometer is to be put. Thus, if the thermometer is to be used to measure ambient temperatures or machine temperatures where length of the thermometer is not of paramount importance, the expanded section 16 need not be substantially larger in cross-section than the calibrated section 18. However, where a thermometer of this invention is to be used as a clinical thermometer, it is of major importance to provide a relatively short, narrow thermometer. Therefore, in a clinical thermometer of this invention, the expanded section 16 of the channel 14 should have a substantially larger cross-sectional area than the calibrated section 18 of the channel. In a clinical thermometer 5 inches in length and having a 0.033 cu. in. reservoir 15, satisfactory results have been obtained where the channel 14 had the following dimensions: expanded channel section 14—length: 1¼ in.; cross-section: 8.9 x $10^{-4}$ sq. in.; and calibrated section 18—length: 3¼ in.; cross-section: 5.6 x $10^{-5}$ sq. in.

The length of the calibrated section 18 of the channel 14 is based upon Federal specifications which requires that a specific number of degrees be shown and designates the width of the printed line so that the temperature scale is properly readable. The depth and width of the calibrated section 18 are chosen so that the upper end of the indicator fluid column in the calibrated section can be easily seen.

A second expanded channel section (not shown) which communicates with both the channel 14 and the air expansion chamber 17 to form a single continuous path between the channel and expansion chamber may be employed in thermometers of this invention which are subjected to temperatures substantially above the temperature range for which the thermometer is calibrated. For example, with clinical thermometers calibrated to read temperatures up to about 120° F., a second expanded channel section communicating with the channel 14 will prevent liquid from flowing over into the expansion chamber 17 when temperatures above about 120° F. are encountered.

Communicating with the upper end 18 of the channel 14 is the gas expansion chamber 17 which, preferably, is positioned adjacent the channel as shown in FIGURES 1 and 2. A gas expansion chamber 17 is necessary to the thermometers of this invention. In the absence of such a chamber, the air or gas presure above the liquid column in the channel 14 prevents the liquid column from rising with increasing temperature as it should and may even completely prevent the liquid column from moving. The volume of the expansion chamber 17 depends upon the amount of fluid contained in a particular thermometer and upon the relative movement of the liquid column.

However, to be effective the gas expansion chamber has a volume which is at least about 10 times larger than the volume of the channel 14. For a clinical thermometer containing about 0.4 cc. of mineral oil and having the channel and reservoir dimensions previously described, an expansion chamber 17 having a volume of about .117 cu. in. has proven to be satisfactory.

The combined volume of the reservoir 15 and the channel 14 is adjusted so that no liquid passes over into the gas expansion chamber 17 when the thermometer 10 is subjected to the highest temperature for which it is to be serviceable. If any liquid 20 should pass over into expansion chamber 17, the thermometer 10 must be discarded.

The base member 11 is formed from a rigid plastic material which is preferably injection moldable. Examples of such plastics are polycarbonates, rigid polyvinylchlorides, acrylics and polystyrenes.

To provide a plastic thermometer which is easily assembled, it is preferable to employ a cover member 13 which is somewhat narrower in width than the base member 11. In thermometers where the cover member 13 is narrower than the base member 11, the base member is provided with a pair of opposing side extensions 22 which extend above the face 21 of the base member. The distance between the side extensions 22 is substantially equal to the width of the cover member 13 so that a snug fit is obtained between the cover and base members.

The cover member 13 is made from a hard, clear plastic which is preferably the same plastic from which the base member 11 is made to minimize fracturing due to differences in thermal expansion between the materials comprising the cover and base members. A desired temperature scale 30 is printed one the cover member 13 adjacent the calibrated section 15 of the channel 14.

The thickness of the cover member 13 is variable and depends upon the thermal conductivity and rigidity of the material from which the cover member is made. To ensure that changes in liquid column position are due substantially solely to temperature changes and not to any appreciable extent to pressure applied to the liquid due to pressure applied to the cover member 13, a cover member thickness should be used which does not appreciably transmit pressure applied to the cover of the liquid. However, the cover member 13 should not be so thick that the cover member tends to act as a thermal insulator. That is, the thickness of the cover member 13 should be sufficient to make the cover member substantially rigid and still provide a short temperature response time. Utilizing a polystyrene cover, the thickness is above about 0.010 in. and is preferably 0.015 in.

The base and cover member 11, 13 may be bonded together in any suitable manner provided the cross-sectional area of the channel 14 remains substantially uniform in the calibrated section 18. At present, it is preferable to bond the base and cover members 11, 13 together using a high peel strength, contact and cold flow adhesive layer 12. The thickness of the adhesive layer 12 should be sufficient to prevent voids from forming between the base and cover member 11, 13 to prevent loss of liquid from the channel 14 and to prevent variation in the channel cross-section which would render calibration on an assembly-line basis impossible. Additionally, the thickness of the adhesive layer 12 should not be so thick that the channel 14 is blocked. An adhesive layer thickness of about 0.00075 in. has been found to be satisfactory in a thermometer employing Monsanto Lustrex General Purpose Styrene base and cover members 11, 13 and Shordon-998 as the adhesive.

In addition to, or in lieu of, using an adhesive layer 12, the base and cover members 11, 13 may be bonded together using ultrasonic bonding techniques. Bonding by ultrasonic methods is preferable in areas where the cover member-base member interface is subjected to particularly high pressures even when an adhesive is employed. Such an area is the region around the reservoir 15 which is subjected to relatively high hydraulic pressure during the filling and capping step.

The liquid reservoir 15, which is defined by walls 23 and a bottom 24 has a filler aperture 25 located in one of the walls or in the bottom as shown in FIGURE 6. The filler aperture 25 may be smaller than the bottom 24 of the reservoir (as shown in FIGURE 3) or it may be equal in size to the bottom. Circumventing the aperture 25 is a shoulder 26 which is sized to receive a closure cap 27 which is bonded into position on the shoulder 26 to close the aperture after the reservoir 15 has been filled. To provide maximum reservoir capacity without forming corners in the bottom 24 which might trap air bubbles, the bottom is provided with a sloping surface 28 which slopes downward from the center of the reservoir towards the wall 23' of the reservoir. For convenience of filling the reservoir 15 in a manner which eliminates any air or gas bubbles from the liquid, it is preferable to locate the filler aperture in the bottom 24 of the reservoir 15.

The reservoir 15 is substantially larger than the reservoir of conventional thermometers. When the reservoir 15 is designed as described herein before, a relatively large, cross-sectional area of the reservoir has to be covered by the cover member 13. A cover member having a desired thickness for that transfer purposes may be too flexible when extended unsupported across the aforementioned large, reservoir cross-sectional area. That is, such a cover member may transmit significant amounts of pressure to the liquid thereby rendering the calibration of the thermometer meaningless. Therefore, it is preferable to employ a support 29 in the reservoir 15 to increase the rigidity of the cover member 13 above the reservoir. This preference exists even with cover materials which may be made sufficiently rigid without support by, for example, increasing thickness, because it is always desirable to employ cover member 13 of minimum thickness to increase thermometer response time (the time required to transmit temperature changes to the liquid).

The support 29 may be columnar as shown in FIGURE 6 or it may be in the form of a wall extending across the reservoir bottom 24 (not shown). A single support or a plurality of supports may be used. The support 29 extends upwardly from the bottom 24 of the reservoir 15 to the plane of the face 21 of the base member 11. When the cover member 13 is bonded in position on the base member 11, the undersurface of the cover member abuts the upper surface of the support 29.

The liquid employed in the herein-described thermometers is an organic liquid having a low evaporation rate, that is, having a relatively low vapor pressure, to prevent loss of liquid due to permeation of the adhesive layer by vapors formed from the liquid. Additionally, the liquid must not be a solvent for the plastic material forming the thermometer or for the adhesive. The liquid should have a reasonably high thermal expansion in relation to the plastic material forming the thermometer so that a unit change in temperature produces a change in liquid column length which may be easily noted. Examples of suitable liquids are mineral oil and olive oil. Mineral oil is preferred for production purposes because it is available as a consistently uniform product although its coefficient of thermal expansion is close to the lower limit of permissible thermal expansion coefficient values. Olive oil has a higher and therefore more desirable coefficient of expansion but its presently not available at competitive prices as a consistently uniform product.

A coloring agent or dye may be added to the liquid to make the liquid column in the thermometer more easily seen. The coloring agent is added in relatively small amounts, for example, about 2 grams of coloring agent to 2 gallons of liquid. An example of a suitable coloring agent is an oil soluble Aniline dye such as Oil Red, B.C. 30278, manufactured by National Aniline Division of Allied Chemicals.

Assembly and calibration of the thermometer of this invention will now be described. The base member 11 is first cleaned with a rinse solution, for example, alcohol, and then dried, for example, by high pressure air. The cover member 13, which preferably has an adhesive layer 12 bonded to it, is pressed onto the base member 11 with the adhesive layer sandwiched between the cover and base members. A pressure of about 2000 p.s.i. is applied to the thus-assembled parts for about 5 minutes to ensure a good bond between the cover and base members 11, 13. The area of the upper face 21 of the base member around the liquid reservoir 15 is ultrasonically bonded to the adjacent areas of the cover member 13.

With the part held in a near horizontal position, the liquid reservoir 15 is filled with liquid 20. All air bubbles are allowed to escape from the reservoir. The closure cap 27 is positioned over the filler aperture 25 and is ultrasonically sealed to the shoulder 26 circumventing the aperture 25. At this point, the thermometer is completely sealed.

The thermometer 10 is placed in an environment, for example, warm air, at a temperature greater than the highest temperature for which the thermometer is to be calibrated. For a clinical thermometer calibrated to indicate temperatures up to 106° F., the environment will be at a temperature above about 106° F. Placing the thermometer 10 initially in a heated environment causes the liquid column 20 to travel up the channel 14 thereby coating the channel including the adhesive 12 to which some of the liquid adheres. Such precoating ensures that repeated use will provide the same readings.

The thermometer 10 is removed from the elevated temperature environment and placed in an environment at room temperature until the liquid column stabilizes at room temperature. The thermometer 10 is then brought up to 98.6° F. and held there for about three minutes at which time the temperature scale is registered and printed. For quality control purposes, the thermometer environment is returned to room temperature and subsequenty increased to 98.6° F. If the thermometer has been assembled as described, the temperature at 98.6° F. will be repeated and the thermometer will be ready for packaging.

It will be understood that the foregoing method of calibration is variable depending upon the intended use of the thermometer.

Modifications of the herein-described invention may be made by those skilled in the art without departing from the spirit of the invention. Therefore, the scope of this invention is to be limited only by the appended claims.

I claim:

1. A thermometer comprising:
an elongated plastic member defining a reservoir at one end thereof, a thin bore running generally along the length of said member having one end thereof communicating with said reservoir, and a chamber substantially larger in volume than the volume of said bore communicating with said other end of said bore;
a graduated scale on said thermometer adjacent at least a portion of said bore;
and an organic liquid carried in said reservoir and said bore, said chamber and any portion of said bore not filled with said organic liquid being filled with gas.

2. The thermometer of claim 1 wherein said organic liquid fills said reservoir and at least partially fills said bore at a temperature below the lowest temperature indicated by said scale, said temeprature being the lowest temperature at which said thermometer remains operable.

3. A disposable thermometer comprising:
a base member having formed therein a reservoir, a channel communicating with said reservoir and a gas expansion chamber communicating with said channel of substantially larger volume than said channel, said reservoir, channel and chamber opening through a first face of said base member;
a cover member sealingly engaging said first face of said base member to provide a cover for said reservoir, said channel and said gas expansion chamber, said cover member having graduated scale markings over at least a part of the channel; and
an organic, temperature-expansible liquid having a relatively low vapor pressure carried in said reservoir and said channel, said organic liquid present in amount at least sufficient to fill said reservoir at the lowest temperature at which said disposable thermometer is to be serviceable, and a gas in said gas expansion chamber and in that portion of said channel not occupied by said liquid.

4. The disposable thermometer of claim 3 wherein said channel has a lower, and an upper section, said lower section having a larger cross-sectional area than said upper section and having a volume sufficient to accommodate the thermal expansion of said organic liquid up to about the minimum temperature for which said thermometer is calibrated.

5. The disposable thermometer of claim 3 wherein the volume of said gas expansion chamber is at least about 10 times the volume of said channel.

6. The disposable thermometer of claim 3 wherein said organic liquid is selected from the group consisting of olive oil and mineral oil.

7. The disposable thermometer of claim 3 wherein said base member and said cover member are formed from the same material.

8. The disposable thermometer of claim 7 wherein said material is selected from the group consisting of acrylics, polycarbonates, and rigid polyvinylchlorides and polystyrenes.

9. The disposable thermometer of claim 3 wherein said channel is of varying cross-sectional area.

10. The disposable thermometer of claim 3 wherein said base member and said cover member are ultrasonically bonded together.

11. A disposable thermometer comprising:
a moldable plastic base member having formed in a first face thereof,
(a) a liquid reservoir,
(b) a filler aperture located in a second face of said base member communicating with said liquid reservoir;
(c) a channel communicating with said liquid reservoir and extending along a substantial portion of the length of said base member, said channel comprising a first section having a relatively large cross-sectional area and comprising a second section furthest from said liquid reservoir having a relatively narrow cross-sectional area,
(d) an air expansion chamber communicating with an end of said second section of said channel furthest removed from said liquid reservoir, said expansion chamber having a volume at least about 10 times the volume of said channel;
an adhesive layer comprising a cold-flow, contact adhesive for sealingly bonding said cover member to said first face of said base member, and to said support;
a closure cap sealingly closing said filler aperture; and
an organic, temperature-expansible liquid having a relatively low vapor pressure and a relatively high coefficient of thermal expansion, in amount greater than the volume of said liquid reservoir at the lowest temperature at which said thermometer is intended to be operable.

12. The thermometer of claim 11 wherein said base member and said cover are formed from a material selected from the group consisting of acrylics, polycarbonates, rigid polyvinylchlorides and polystyrenes.

13. The thermometer of claim 11 wherein the material forming said cover member and the material forming said base member are the same.

14. The thermometer of claim 11 wherein said fluid is a member of the group consisting of olive oil and mineral oil.

15. The thermometer of claim 11 wherein said reservoir contains a support member extending upwardly from the bottom of said reservoir to the plane of said first face of said base member, said support member abutting said cover member is in sealing engagement with said base member.

References Cited

UNITED STATES PATENTS

| | | | |
|---|---|---|---|
| 1,574,346 | 2/1926 | Goodhue | 73—368.2 |
| 2,691,892 | 10/1954 | Broad | 73—371 |
| 3,350,490 | 10/1967 | Le Beau | 73—371 XR |

LOUIS R. PRINCE, Primary Examiner

WILLIAM A. HENRY II, Assistant Examiner

73—368.2

PO-1050
(5/69)

UNITED STATES PATENT OFFICE
CERTIFICATE OF CORRECTION

Patent No. 3,469,451      Dated September 30, 1969

Inventor(s) Arthur Eizenberg

It is certified that error appears in the above-identified patent and that said Letters Patent are hereby corrected as shown below:

Column 2, Line 43, after "a" and before "view",
"cros-sectional" should be --cross-sectional--.

Column 3, Line 29, after "organic,"
"temperature-expandable" should be --temperature-expansible--.

Column 4, Line 22, after "temperature" and before "and",
insert --)--.

Column 5, Line 33, after "printed" and before "the",
"one" should be --on--.

Column 5, Line 68, before "as",
"Shordon-998" should be --Shirdon-998--.

Column 7, Line 67, in Claim 2, after "said" and before "being",
"temeprature" should be --temperature--.

SIGNED AND
SEALED
NOV 10 1970

(SEAL)
Attest:

Edward M. Fletcher, Jr.
Attesting Officer

WILLIAM E. SCHUYLER, JR.
Commissioner of Patents